Sept. 16, 1969    E. S. WOODHALL    3,467,567
TIRE BUILDING MACHINE
Filed Dec. 23, 1965    2 Sheets-Sheet 1

INVENTOR.
EDWIN S. WOODHALL
BY
J. B. Holden
ATTORNEY

INVENTOR.
EDWIN S. WOODHALL
BY
*J. B. Holden*
ATTORNEY

United States Patent Office 3,467,567
Patented Sept. 16, 1969

3,467,567
TIRE BUILDING MACHINE
Edwin S. Woodhall, Cuyahoga Falls, Ohio, assignor to The Goodyear Tire & Rubber Company, Akron, Ohio, a corporation of Ohio
Filed Dec. 23, 1965, Ser. No. 516,045
Int. Cl. B29h 17/16
U.S. Cl. 156—415                                       15 Claims

ABSTRACT OF THE DISCLOSURE

A tire building machine having positive locking means for holding the drum segments in a fixed concentric expanded position and operable by single fluid pressure connection.

The foregoing abstract is not to be taken as limiting the invention of this application, and in order to understand the full nature and extent of the technical disclosure of this application, reference must be made to the accompanying drawings and the following detailed description.

---

This invention relates to machines for building pneumatic tires and more particularly to a novel improvement in tire building machines of the type having a drum which is expansible under the influence of an inflatable member or members. Such tire building machines are well known, and one such machine is shown in U.S. Patent No. 3,078,204, issued Feb. 19, 1963. The machine of the aforementioned patent generally comprises a central rotatable drum and a pair of auxiliary drums at each end of the central drum. The central drum comprises a plurality of sets of rigid elements or segments, with the sets being aligned axially of the drum and with the segments in each set thereof being arranged circularly about and concentric with the axis of the drum. The segments are mounted for movement radially of the drum axis, and an inflatable annular bladder or air bag is associated with each set of segments. Each bladder is arranged to act on the respectively associated segments to move the same radially outwardly in response to inflation of the bladder. The building surface of the drum is provided by an elastomeric sleeve, generally cylindrical in shape, and disposed over the segments coaxially of the drum. In the use of this machine, after a tire ply or band has been arranged over and about the drum, the bladders are inflated to move the segments outwardly, thus increasing the effective diameter of the sleeve and the band. This expansion of the central drum must be maintained during what is commonly referred to as a stitching operation, at which time, a substantial pressure is exerted on the tire components supported on the drum, with this pressure being directed radially inwardly of the drum. It will thus be apparent that substantial fluid pressure must be maintained within the bladders in order to resist the stitching pressure and to maintain the desired diameter and cylindrical shape of the central drum during the stitching operation.

It is the object of the present invention to provide a machine of the general type described having novel and improved means for maintaining the central drum in an expanded condition which does not rely upon inflated bladders or the like, so as to eliminate any yielding of the drum during any of the tire building operations when the drum is expanded.

It is further an object of the present invention to provide a tire building machine of the general type described having novel and improved means for insuring a higher degree of accuracy and concentricity in the external circumference of the drum when it is expanded.

Other objects will be in part obvious, and in part pointed out more in detail hereinafter.

The invention accordingly consists in the features of construction, combination of elements and arrangement of parts which will be exemplified in the construction hereafter set forth, and the scope of the application of which will be indicated in the appended claims.

Figure 1:
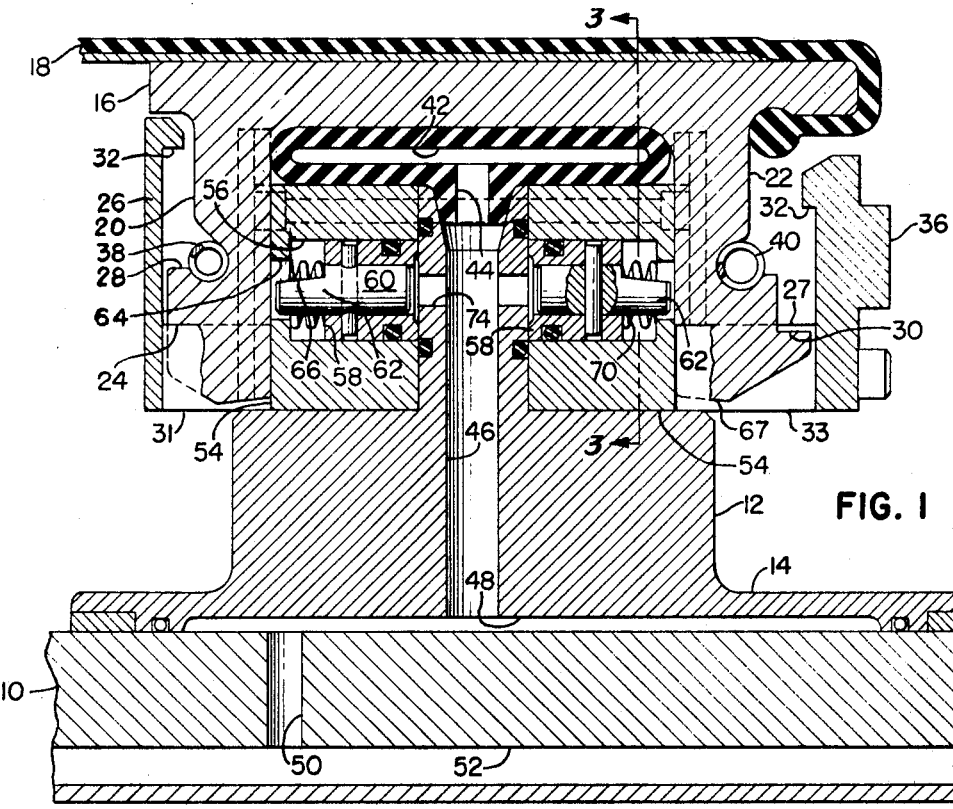
FIG. 1 is a fragmentary, cross-sectional view of a drum of a tire building machine incorporating the present invention.
Figure 2:
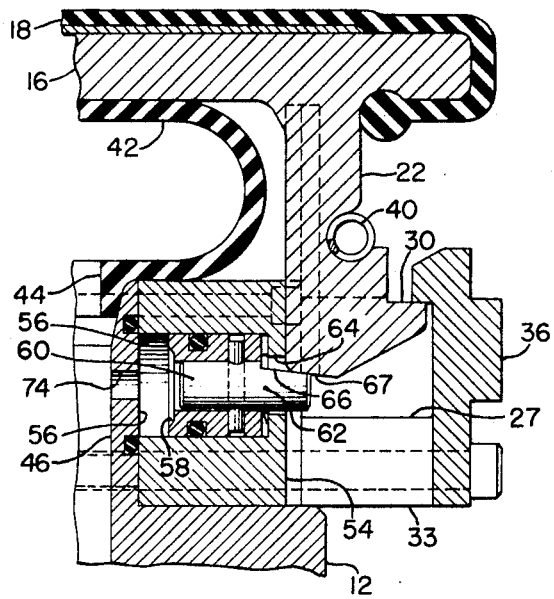
FIG. 2 is a fragmentary, cross-sectional view similar to FIG. 1 with the drum expanded.
Figure 3:
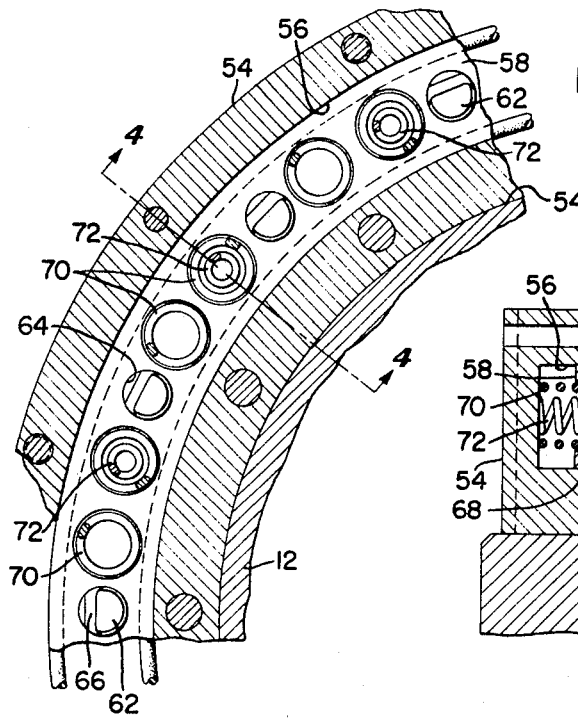
FIG. 3 is a fragmentary, cross-sectional view of a portion of the mechanism shown in FIG. 1 taken substantially along the line 3—3 of FIG. 1.
Figure 4:
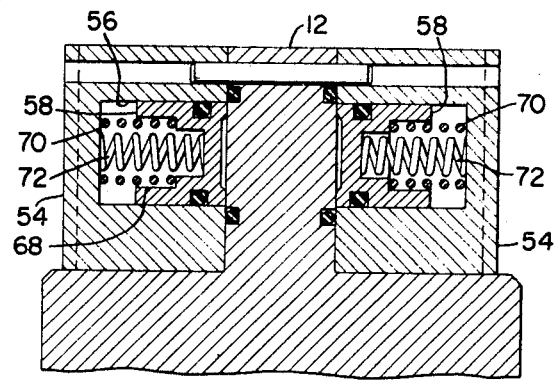
FIG. 4 is a cross-sectional view substantially along the line 4—4 of FIG. 3.
Figure 5:
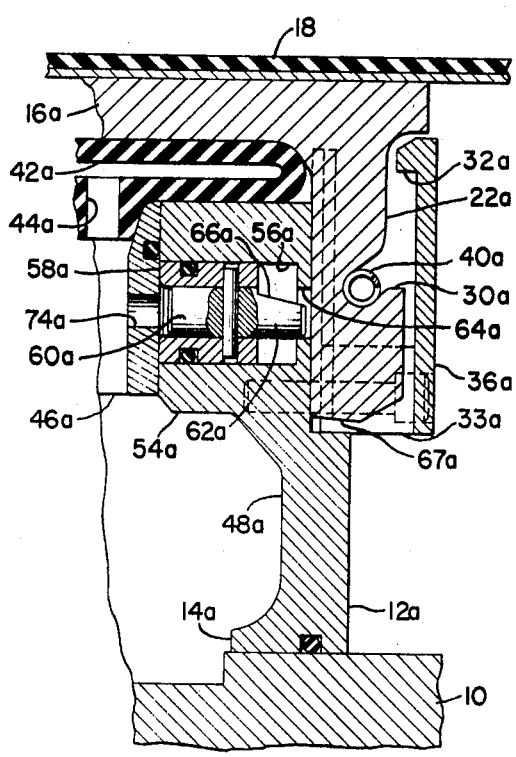
FIG. 5 is a fragmentary, cross-sectional view of another portion of the drum of the machine of FIG. 1.

While the present invention is not limited to use with tire building machines of the specific type shown in the aforementioned Patent No. 3,078,204, for convenience and in the interest of brevity, the invention will be described in connection with such a machine. Accordingly, reference should be made to the aforementioned patent for details of instruction and operation of the overall machine which are not specifically described or shown herein. With reference to the drawings, and particularly FIG. 1, the tire building machine comprises a suitably supported rotatable shaft 10 extending coaxially of the drum and mounting a support member or spider 12 which has a hub 14 telescopically arranged over and slidable axially upon the shaft 10. A plurality of rigid elements or segments 16 are slidably supported on and guided for movement relative to the spider 12 and radially of the drum axis. While only one of such segments 16 is shown, it will be understood that the segment 16 is only one of a set of a plurality of such segments circularly arranged concentrically with the drum axis in the manner of the similar elements shown in the aforementioned patent. The radially outer surface of each segment 16 is curved about the drum axis and provides support for an elastomeric sleeve 18 which is generally cylindrical in shape and is arranged coaxially of the drum. As in the case of the segments of the aforementioned patent, it is intended that, in the present machine, there shall be a set of segments 16, as shown in FIG. 1, disposed at one end of the drum and a second set of segments, not shown, substantially identical to the first set and disposed at the other end of the drum with the second set being in reversed relationship to the segments of the first set. Intermediate these two sets of segments, and as similar to the machine of the aforementioned patent, it is intended that there shall be a third set of segments 16a with the third set being constructed and arranged as shown in FIG. 5 hereof.

With reference to FIG. 1 each segment 16 has, at its ends, depending portions or legs 20 and 22 extending radially inwardly of the drum. Radially inward movement of each segment is positively limited by the engagement of the downwardly or inwardly facing surfaces, as at 24, or the segment respectively with the outwardly or upwardly facing surfaces, as at 27, of members or blocks 31, 33 fixed relative to the spider 12 at a fixed distance from the drum axis. These cooperating portions of the segments and means fixed radially relative to the drum axis assure that the outer surface of the drum is cylindrical and concentric with the drum axis when the segments are in their lower or radially innermost limit position. Positive upper limit stop means are provided for each segment by means of upwardly facing surfaces 28 and 30 on the depending portions 20 and 22 of each segment 16, which surfaces are engageable, respectively, with an inwardly or downwardly facing surface 32 on rigid stop members 26, 36 which are fixed relative to the blocks 31, 33 and the spider 12. The construction and arrangement of the upper limit stop means is such to assure that the outer surface of the drum will be cylindrical and concentric with the drum axis when the segments are in their outer or upper limit positions. A pair of springs 38 and 40 arranged concentrically of the drum axis are engaged with each of the segments 16 in a respective set thereof to urge the same toward their lower limit stops.

In oder to move the segment 16 radially outwardly, there is provided an annular inflatable bladder or air bag 42 arranged concentrically of the drum axis and acting on the underside of the segment 16, whereby inflation of the air bag will move the segments, simultaneously, in a direction radially outwardly of the drum axis. The air bag is provided with one or more inlets, as at 44, each of which are engaged within one end of a passage 46 extending radially through the spider 12. The inner end of the passage 46 communicates with a chamber 48 formed by clearance between the shaft 10 and hub 14 of the spider. The shaft 10 is provided with a passage or passages 50 extending radially therethrough and communicating at one end with the chamber 48 and at the other end with a passage 52 within the shaft. The passage 52 is adapted to be connected by suitable means, not shown, to a source of pressurized fluid, such as air.

In accordance with the present invention, means are provided to lock the segments, positively, against the outer limit stops in response to inflation of the air bag 42 sufficiently to engage, or at least nearly engage, the segments with the upper limit stops. More particularly, and in a preferred embodiment as shown in FIGS. 1 to 4, a pair of annular cylinder rings 54 are seated on the spider 12 in fixed relation thereto, with the rings being disposed coaxially of the drum and spaced apart on opposite sides of the radially outwardly annular projection of the spider through which the passage 46 extends. Each cylinder ring has on one end face a concentric annular groove 56 which at its inner end terminates short of the opposite end face of the ring.

Slidably received in each of the annular grooves 56 is an annular piston or ring 58. Seals such as O rings are provided between the inner diameter and outer diameter, respectively, of the piston and the adjacent side walls of the groove 56. Each piston is provided with a plurality of generally cylindrical inserts or locking members 60 engaged within openings extending through the piston and spaced preferably equi-angularly about the axis of the piston. Each locking member is fixed within the associated piston by means of a roll pin or dowel received in radially extending openings in the piston and an aligned opening extending through the respective locking member. Each locking member 60 extends parallel to the drum axis and beyond the end face of the piston which faces axially outwardly of the spider 12 and toward a next adjacent depending portion of a segment 16. This projecting portion 62 of each locking member is extendible through one of a plurality of openings 64 in the cylinder ring 56 respectively associated with the locking members 60. Each opening 64 is coaxial with a locking member 60 and has a diameter exceeding that of the projecting portion 62 so that the projecting portion may be freely moved through the opening. Each projecting portion 62 has an inclined wedging or cam surface 66 which is inclined from the outer or distal end of the projecting portion 62 radially outwardly of the drum axis. The cam surface 66 faces generally radially outwardly of the drum axis and is cooperably engageable with a similar, but oppositely facing, inclined surface 67 on the next adjacent depending portion or leg of a segment 16.

Each piston 58 is normally maintained in a retracted position adjacent the inner end of the associated cylinder ring by resilient means urging the piston toward the inner end of the cylinder ring and away from the next adjacent depending portions of the segments 16. More specifically, and as shown clearly in FIGS. 3 and 4, each piston is provided with a plurality of generally cylindrical recesses 68 in the end face thereof next adjacent the respectively associated depending legs or portions of the segment. The recesses 68 are spaced angularly about the axis of the piston with preferably two of such recesses being located between each opening 64 in the piston. A preloaded compression coil spring 70 is received at one end within each of the recesses 68 and is seated on the bottom wall of the recess. The other end of each spring 70 is engaged with the bottom wall of the annular groove 56 in the cylinder ring 54. In order to provide a fine adjustment of the spring force acting on the piston 58, a preloaded coil compression ring 72 is located telescopically within each of certain of the springs 70 so as to act in parallel therewith. In the present embodiment shown, an inner spring 72 is located within alternate ones of the outer springs 70 associated with each piston. One end of each spring 72 is seated on the piston 58 with the other end of the spring being seated on the bottom wall of the groove 56 of the cylinder ring.

A plurality of branch passages 74 are provided in the spider 12 each leading from an inlet passage 46 to the interior of a groove 56 in a cylinder ring 54 so as to communicate with the end face of a piston 58 next adjacent the passage 46 and opposite the projecting portion 62 of the locking member 60. It will, therefore, be apparent that fluid pressure within the passage 46 will act on the pistons 58 to tend to move the same parallel to the drum axis and toward the next adjacent depending portions or legs of the segments 16. It will also be apparent that there is thus provided a common fluid pressure supply means for the bladder 42 and for the pistons 58.

In accordance with the present invention the springs 70 and 72 are sufficiently preloaded that they will prevent any significant outward movement of the pistons 58 until there exists within the common supply passage 46 a predetermined fluid pressure consistent with movement of the segments radially outwardly to, or at least closely adjacent, the upper limit stops for the segments. More specifically, when fluid pressure is exerted internally of the bladder 42 so as to move the segments radially outwardly, the springs 70 and 72 will maintain the piston ring in its retracted position shown in FIG. 1, or at least out of engagement with the segments, until the segments have been moved sufficiently outwardly to engage, or at least nearly engage the surfaces 28 and 30 of the segments with the stop surfaces 32 and 34 on the stop members 26 and 36. It will be understood that, by reason of the elastomeric sleeve 18 disposed over the segments and the springs 38 and 40, there will be a fluid pressure within the passage 46 corresponding to the various positions of the segments as they are moved radially outwardly. When the segments have reached the outer limit stops or nearly so, the fluid pressure within the passage 46 will effect outward movement of the pistons 58 against the force of the springs 70 and 72 so as to engage the cam surfaces 66 and 67 of the locking members 60 and depending portions of the segments respectively. The engagement of these cam surfaces will tend to move the segments toward the outer limit stops and will maintain the segments in their upper limit position so long as the pressure is not reduced within the passage 46. On reduction or relief of pressure within the passage 46, the springs 70 and 72 will retract the pistons 58 and disengage the cam surfaces 66 and 67, thus permitting the segment to be retracted radially inwardly under the influence of the elastomeric sleeve 18 and springs 38 and 40.

The intermediate set of segments shown in FIG. 5 and their respective support and mounting means as well as the locking means associated therewith are essentially the same as those of the end sets of segments previously described. Accordingly, similar numbers have been assigned to similar elements utilizing the suffix letters *a*. While the functions of the various elements associated with the intermediate set of segments 16a are identical with those elements associated with the segment 16, minor differences in structure prevail. For example, the cylinder rings 54a are integral with the spider 12a rather than being separate elements as in the structure shown in FIG. 1. Conversely, each passage 46a associated with the segments 16a is provided by a through bore in a cylindrical member separate from the spider 12a rather than being provided within the spider 12 as in FIG. 1. It will also be understood, although not shown, that springs, such as 70 and 72, are associated with the cylinder rings and pistons 54a and 58a in the same manner and so as to serve the same function as the springs 70, 72 in connection with the segments 16. For reasons fully disclosed within the aforementioned Patent No. 3,078,204, the intermediate spider 12a is not mounted for movement axially of the shaft 10, as in the case of the end spiders 12. The passage 46a is provided with pressurized fluid by means of suitable passages, not shown, similar to the passages 50 and 52 previously described in connection with the segments 16.

It will thus be apparent that there has been provided novel and improved means for maintaining the segments of a tire building drum of the type described in a predetermined radially outward limit position in a manner not dependent on the pneumatic drive means for moving the segments radially outwardly. Accordingly, the building surfaces of the drum, provided by the outer surface of the sleeve 18, will be rigidly supported both when the segments are in their inner and outer limit positions. Thus, any force exerted radially inwardly of the drum on plies supported on the drum will be rigidly resisted, thus effectively preventing any yielding movement of the building surface. The locking means of the present invention are responsive to the fluid pressure supplied to the air bags 42 to provide automatic locking of the segments as soon as they have been moved into engagement with the outer limit stops, or at least nearly so. The cooperable cam surfaces on the segments and locking members on the pistons assure not only that the segments will be rigidly maintained in engagement with the upper limit stops but also provide means for moving the segments, or assisting in moving the segments, during the last portion of their movement into engagement with the upper limit stops.

Also, the delayed action of the locking means assures that the same will not interfere with outward movement of the segments. More particularly, and as will be seen in FIGS. 1 and 5, the projecting portions 62, 62a of the locking members 60, 60a are normally out of engagement with the depending portions of the segments 16, 16a and will remain in this relationship until the pressure within the passages 46, 46a overcomes the biasing force of the preloaded springs acting on the pistons. The inner springs 72, which have a substantially lesser spring rate than the springs 70, provide a means for fine adjustment of the timing of the actuation of the pistons to assure that the same will not be moved outwardly sufficiently to engage the locking members 60 with the segments until the cam surfaces 67, 67a are disposed at least slightly radially outwardly of the cam surface 66, 66a on the locking members.

Not only does the locking means of the present invention assure a rigid building surface when the segments are in their outer limit position, but also assures that the segments will be accurately located so as to assure concentricity of the building surface. Further, inasmuch as the fluid pressure within the bladder or air bag 42 need only be sufficient to move the segments to, or near, the outer positions and need not be sufficiently high to resist the force of stitching mechanism acting on plies supported by the drum, the maximum fluid pressure within the air bags will be substantially less than would be the case were the locking means of this invention not employed. Accordingly, the life of the air bag is substantially increased.

Inasmuch as many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language in the following claims is intended to cover all of the generic and specific features of the invention hereindescribed and all statements of the scope of the invention which, as a matter of language, might be said to fall therebetween.

What is claimed is:

1. A tire building machine comprising a radially expansible drum including at least one set of rigid members for the support of tire elements laid over and about the drum, said members being circularly arranged concentrically of the drum axis, means mounting said members for movement toward and away from the drum axis between an inner position and an outer limit position, fluid pressure operated drive means for moving said members outwardly of said axis, and positive locking means separate from said drive means for rigidly maintaining said members in said outer limit position, said locking means being responsive to pressure of fluid operating said drive means to actuate said locking means.

2. A tire building machine as described in claim 1 in which said locking means includes cam means engageable with means on one of said members to tend to move said one of said members toward said outer limit position.

3. A tire building machine as described in claim 1 in which said locking means includes fluid pressure operated means engageable in locking relationship with means movable with one of said members in response to, and only after application of, fluid pressure to said drive means sufficient to move said one of said members at least substantially into said outer limit position.

4. A tire building machine as described in claim 1 further comprising positive stop means engageable with first means movable with said members to limit the extent of movement of said members away from said axis, said locking means including cam means fixed radially relative to said axis and engageable with second means movable with said members to tend to move said members away from said axis and to maintain said first means in engagement with said stop means.

5. A tire building machine comprising a radially expansible drum including at least one set of rigid members for the support of tire elements laid over and about the drum, said members being circularly arranged concentrically of the drum axis, means mounting said members for movement toward and away from the drum axis between an inner position and an outer limit position, fluid pressure operated drive means for moving said members outwardly of said axis, and positive locking means separate from said drive means for rigidly maintaining said members in said outer limit position, and common pressure supply passage means communicating an actuating fluid pressure to said drive means and to said locking means.

6. A tire building machine as described in claim 5 in which said drive means comprises an inflatable member acting on said members to move the same away from said axis in response to the introduction of pressurized fluid into said inflatable member, means urging said members toward said axis, said locking means including rigid locking elements movable into supporting relationship with said rigid members to prevent movement of said rigid members toward said axis, preloaded resilient means urging said locking elements away from said supporting relationship and means including said passage means for conducting pressurized fluid simultaneously into communication with the interior of said inflatable member and with said locking means to inflate said inflatable member and to tend to move said locking elements toward said supporting relationship, said resilient means being preloaded sufficiently to prevent any significant amount of fluid pressure induced movement of said locking elements until said inflatable member is sufficiently inflated that said members have been moved at least substantially into said outer limit position.

7. A tire building machine as described in claim 5 in which said locking means comprises a piston and cylinder, first passage means for directing pressurized fluid to one end of said piston to move the same in one direction toward and into engagement with cooperating means on one of said members, said piston and cooperating means being engageable to prevent movement of said one of said members toward said axis, and second passage means communicating with said first passage means and said drive means for the simultaneous supply of pressurezied fluid to said drive means and said first passage means, and resilient means urging said piston in a direction opposite said one direction.

8. A tire building machine as described in claim 7 in which the last mentioned means is preloaded sufficiently to prevent any significant movement of said piston in said one direction until the pressure in said second passage means is sufficient to effect outward movement of said one of said rigid members into close proximity to said outer limit position.

9. A tire building machine as described in claim 5 in which said locking means includes means providing an annular chamber, an annular piston slidably received in said chamber, means for directing fluid pressure into one end of said chamber and into communication with one end of said piston to move said piston axially of itself in one direction, resilient means acting between one wall of said chamber and the other end of said piston to urge the piston in a direction opposite said one direction, stop means on said piston extendable through openings in said one wall of said chamber, and means on said rigid members engageable by said stop means upon said piston a predetermined distance in said one direction for preventing movement of said rigid members toward said axis.

10. A tire building machine as described in claim 9 in which said resilient means comprises a plurality of preloaded coil compression springs acting between said one wall of said annular chamber and said piston, said springs being circularly arranged about the axis of said piston.

11. A tire building machine as described in claim 10 in which at least some of said springs have a spring rate substantially less than the remainder of the springs and act in parallel with said remainder of the springs.

12. A tire building machine as described in claim 5 in which each of said rigid members has a pair of depending portions spaced apart in a direction parallel to said axis, a pair of annular pistons disposed coaxially of said drum and between the depending portions of the rigid members, means providing cylinder means slidably receiving said pistons for movement toward and away from said depending portions, said supply passage means being in communication with the ends of said pistons consistent with movement of said pistons in opposite directions and each toward respectively associated depending portions, means on each piston engageable with cooperable means on the respectively associated depending portions to prevent movement of said rigid members toward the drum axis, and means urging said pistons away from said depending portions.

13. A tire building machine as described in claim 12 further comprising a generally cylindrical elastomeric sleeve arranged over said rigid members and concentrically of said drum axis, said sleeve being supported by said rigid members, means urging said rigid members toward the drum axis, means limiting movement of said rigid members inwardly of said axis, positive stop means engageable with said rigid members to limit movement of said rigid members outwardly of said axis, said means urging said pistons away from said depending portions being preloaded sufficiently to prevent any significant movement of each piston toward said depending portions respectively associated therewith until the fluid pressure acting on said drive means is sufficient to effect movement of said rigid members at least substantially into engagement with said positive stop means.

14. A tire building machine as described in claim 5 in which said drive means is an annular inflatable bladder arranged concentrically of said rigid members between said rigid members and said drum axis, said means urging said pistons comprising a plurality of coil springs circularly arranged concentrically of the drum axis, said springs being preloaded sufficiently to prevent engagement of the pistons and said depending portions until said inclined surface on each piston is in cooperative alignment with the respectively associated cooperable means on the rigid members.

15. A tire building machine comprising a radially expansible drum including a generally cylindrical elastomeric sleeve and at least one set of rigid members disposed coaxially within said sleeve for the support of tire elements laid over and about the drum, said members being circularly arranged concentrically of the drum axis, each of said members having a pair of depending portions spaced apart in a direction parallel to said axis, means mounting said members for movement toward and away from the drum axis between an inner position and an outer limit position, fluid pressure operated drive means for moving said members outwardly of said axis, positive locking means separate from said drive means and including a pair of annular pistons disposed coaxially of said drum and between said portions of the rigid members, means providing cylinder means slidably receiving said pistons for movement toward and away from said depending portions, means on each piston engageable with cooperable means on the respectively depending portions to prevent movement of said rigid members toward the drum axis, common fluid supply pressure passage means connected to said drive means and to said cylinder means, said supply passage means being in communication with the ends of said pistons consistent with movement of said pistons in opposite directions and toward respectively associated depending portions, positive stop means engageable with means on said rigid members to limit movement of said rigid members outwardly of said axis, means urging said pistons away from said depending portions respectively, the last said means being preloaded sufficiently to prevent significant movement of said pistons toward said depending portions respectively associated therewith until the fluid pressure acting on said drive means is sufficient to effect movement of said means on said rigid members at least substantially into engagement with said positive stop means, said means on each piston comprising a surface engageable with said cooperable means and inclined with respect to the axis of the drum in a direction to tend to move the respectively associated rigid member toward said positive stop means in response to engagement of said surface and said cooperable means.

References Cited
UNITED STATES PATENTS

| | | | |
|---|---|---|---|
| 2,715,931 | 8/1955 | Frazier | 156—415 |
| 3,078,204 | 2/1963 | Appleby | 156—132 |
| 3,188,260 | 6/1965 | Nebout | 156—415 |

EARL M. BERGERT, Primary Examiner

C. B. COSBY, Assistant Examiner

U.S. Cl. X.R.

156—416